United States Patent
Thiede

(10) Patent No.: US 7,561,569 B2
(45) Date of Patent: Jul. 14, 2009

(54) PACKET FLOW MONITORING TOOL AND METHOD

(75) Inventor: David R. Thiede, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 731 days.

(21) Appl. No.: 11/179,230

(22) Filed: Jul. 11, 2005

(65) Prior Publication Data
US 2007/0019640 A1 Jan. 25, 2007

(51) Int. Cl.
H04L 12/28 (2006.01)
(52) U.S. Cl. ............... 370/389; 370/252; 709/223
(58) Field of Classification Search ............ None
See application file for complete search history.

(56) References Cited

U.S. PATENT DOCUMENTS 6,625,161 B1* 9/2003 Su et al. .............. 370/415
2004/0252721 A1* 12/2004 Lingafelt et al. ........... 370/473
2005/0234920 A1* 10/2005 Rhodes .................. 707/10
2006/0285495 A1* 12/2006 Aitken et al. ............ 370/235

* cited by examiner

Primary Examiner—Bob A Phunkulh
(74) Attorney, Agent, or Firm—Law Office of Douglas E. McKinley, Jr.

(57) ABSTRACT

A system and method for converting packet streams into session summaries. Session summaries are a group of packets each having a common source and destination internet protocol (IP) address, and, if present in the packets, common ports. The system first captures packets from a transport layer of a network of computer systems, then decodes the packets captured to determine the destination IP address and the source IP address. The system then identifies packets having common destination IP addresses and source IP addresses, then writes the decoded packets to an allocated memory structure as session summaries in a queue.

15 Claims, 1 Drawing Sheet

PACKET FLOW MONITORING TOOL AND METHOD

Figure 1:
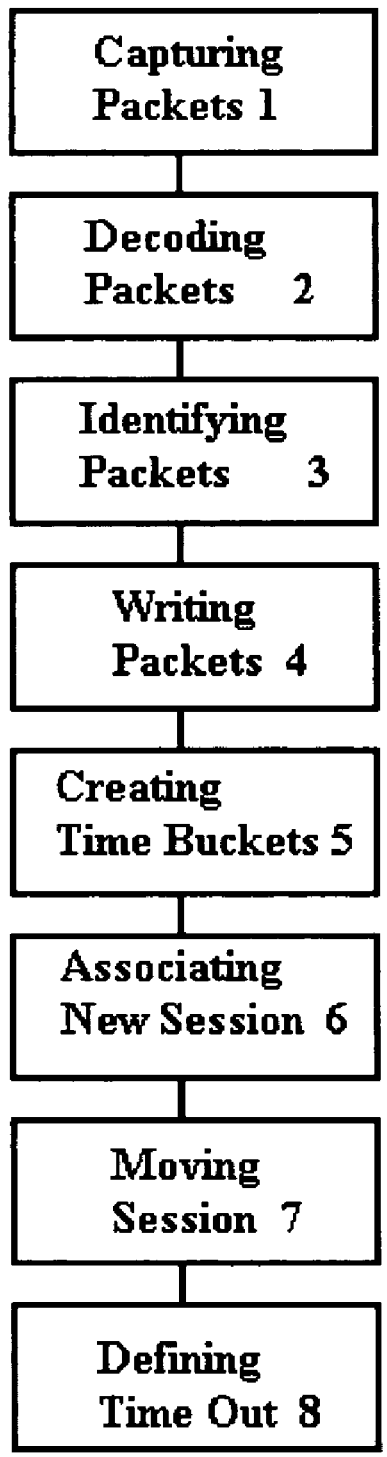

The invention was made with Government support under Contract DE-AC0676RLO 1830, awarded by the U.S. Department of Energy. The Government has certain rights in the invention.

TECHNICAL FIELD

This invention relates to methods and techniques for monitoring the flow of information in a computer network.

BACKGROUND OF THE INVENTION

The widespread use of interconnected computers has greatly enhanced the free flow of information worldwide. The commonly used TCP/IP standard has become particularly widespread, and is utilized by computers operated by academia, industry, government and consumers to share information.

In certain instances, however, the owners and/or users of these computer systems do not wish to have certain information stored on these computers shared with the outside world, and/or they do not wish for the users of these computers to access certain types of information available on other computers also connected to the network. This presents a problem. If a computer is disconnected from a network that allows the user to share information with other computers, it is more difficult for the user of that information to communicate information with the outside world. However, it is also more difficult to access acceptable information that is available by were that computer connected to the network.

Typically, a user's need to have access to the outside world is sufficient that the user's computer remains connected to the network, even though this presents a risk that an undesirable transfer of digital data may take place between that user's computer and the outside world. As a result of this risk, there is a need for methods by which computers that are connected to a network may be monitored, to detect undesirable transfers of digital data either to or from those computers.

One problem associated with the need to monitor these computer systems is associated with the large amounts of digital data that may flow through these systems. For example, and not meant to be limiting, an organization might have hundreds of different computers all connected to the internet, all of which are operated by users who are constantly uploading and downloading digital files from computers outside of the organization. Since any system set up to monitor large data flows is inherently limited by considerations including, but not limited to processor speed, memory, and memory access, there exists a need for better systems and methods that can monitor large data flows with limited system resources.

SUMMARY OF THE INVENTION

Accordingly, it is an object of this invention to provide a system and method for monitoring large data flows. It is a further object of the present invention to provide a system for monitoring large data flows that organizes the data flows in a manner that allows a user to easily review the data flows to determine if data is flowing to or from undesirable sources and/or recipients. These and other objects of the present invention are accomplished by providing a method for converting packet streams into session summaries. Session summaries are defined as a group of packets each having a common source and destination internet protocol (IP) address, and, if present in the packets, common ports, including but not limited to transmission control protocol (TCP) and user datagram protocol (UDP).

The present invention first captures packets from a transport layer of a network of computer systems. Accordingly, the present invention may generally be incorporated into any computer system in communication with the transport layer of a network of computer system as a software program. The present invention thus includes any multipurpose computer system capable of operating a variety of different software programs and configured to perform the steps described herein. These multipurpose computers may also be configured to run other software, either simultaneously or in series, but such is not required. Further, the present invention would include the steps described herein in any tangible, machine readable form that would allow a multipurpose computer system to be configured to perform these steps, including but not limited to electromagnetic forms, such as a floppy disk or a magnetic tape, and optical forms, such as compact disc or a DVD.

As will be recognized by those having skill in the art, any series of steps programmed into a computer as software, including the present invention, can be reproduced by configuring the hardware of the computer to perform the identical steps. Further, a computer capable of multiple configurations can be designated as a single purpose computer, dedicated to performing only one task. Accordingly, the present invention should be understood to include any computer, system, whether multipurpose or single purpose, configured to perform the steps described herein, whether as a series of steps provided to the computer as software, or by configuring the computer's hardware to perform the series of steps.

Once a computer system configured to operate according to the present invention captures packets from a transport layer of a network of computer systems, the present invention then decodes the packets captured to determine the destination IP address and the source IP address. The present invention then identifies packets having common destination IP addresses and source IP addresses. The present invention then writes the decoded packets to an allocated memory structure as session summaries in a queue. Within the queue, each session summary contains only packets having common destination and source IP addresses. In this manner, a large data flow across the transport layer of a network of computer systems is efficiently organized according to the specific source and destination. In this manner, an analyst can efficiently review the data flow to and from a wide variety of sources to determine if any portion of the data flow contains undesirable communications.

In some embodiments of the present invention, the step of decoding the packets further comprises determining TCP port source and destination numbers, flag fields, option fields, sequence number, length parameter, and combinations thereof. By comparing these parameters among the packets being analyzed by the present invention in addition to common destination and source IP addresses, packets having common destination and source IP addresses can be more reliably grouped as being between specific users.

In some embodiments of the present invention, the step of decoding the packets further comprises determining UDP port source and destination numbers and the length parameter. By comparing these parameters among the packets being analyzed by the present invention in addition to common destination and source IP addresses, packets having common destination and source IP addresses can be more reliably grouped as being between specific users.

In a further embodiment of the present invention, packets having common destination and source IP addresses are organized in an allocated memory structure by creating a series of time buckets within the allocated memory structure. Each of the time buckets has a predefined beginning time and a predefined end time. The time buckets are sequential in time. New session summaries are associated with the time bucket covering the time period corresponding to the time the packet was captured from the transport layer. A session summary may then be moved to the time bucket at the front of the queue in response to an incoming packet having a destination IP addresses and source IP addresses matching the session summary. In this manner, the session summaries are organized in an allocated memory structure.

As used herein, an "allocated memory structure" means that the data is written to a fixed location in primary memory. Generally, primary memory (sometimes referred to as "general memory" by those having ordinary skill in the art) is memory that is not used as cache by the processor, but is randomly accessible by the processor. The use of an allocated memory structure thus allows the method of the present invention to assemble the session summaries without copying the data to other locations. This aspect of the present invention, coupled with the aging the sessions, allows the present invention to successfully convert packet streams into session summaries in environments with high levels of packet flow.

As new packets are processed, the session summaries associated with those packets are continually linked and put at the head of the queue. Thus, older session summaries migrate to the end of the queue as a passive result of the processing of new packets, as opposed to any active measures to identify them as older session summaries, such as a mark and sweep function. The use of the packet accumulation step to produce correctly aged session summaries in this manner is a key aspect of the present invention because it allows the overall system to process high volumes of packet flow efficiently. The allocated memory structure thus contains not only the hash and chaining links used in the master session cache, but also includes links used by the aging mechanism. The session either is moved to the head of the aging queue as a result of a new packet being added, or it will be removed from the end as a result of the summary falling outside of the user defined age parameter.

"Aging" sessions is accomplished by defining a "time out value" and deleting session summaries associated with time buckets older than the time out value. In this manner, allocated memory structure remains available for session summaries generated by high levels of data flow.

Transport layers for which the present invention can monitor large data flows include, but are not limited to, fast Ethernet, Ethernet, gig-E, FDDI, and wireless.

In a preferred embodiment of the present invention, separate threads and/or processes are used for the different tasks performed. For example, the step of capturing packets from a transport layer might be performed as a separate thread, and/or on a separate processor as the step of decoding the packets to determine the destination IP address and the source IP address. The steps of identifying packets having common destination IP addresses and source IP addresses and writing the decoded packets to an allocated memory structure as session summaries in a queue, might be performed as a separate thread, and/or on a separate processor. In this manner, each step is allowed to operate semi-independently, and incoming packets are not lost as a result of insufficient processing capability.

FIG. 1 is a graphical representation of the present invention.

The method of the present invention may be illustrated with reference to FIG. 1 which shows the method for converting packet streams into session summaries comprising the steps of 1 capturing packets from a transport layer, 2 decoding the packets to determine the destination IP address and the source IP address, 3 identifying packets having common destination IP addresses and source IP addresses, 4 writing the decoded packets to an allocated memory structure as session summaries in a queue wherein said session summaries contain only packets having common destination and source IP addresses, 5 creating a series of time buckets, each of the time buckets having a predefined beginning time and a predefined end time, wherein the time buckets are sequential in time, 6 associating new session summaries with the time bucket covering the time period corresponding to the time the packet was captured from the transport layer, and 7 moving a session summary to the time bucket at the front of the queue in response to an incoming packet having a destination IP addresses and source IP addresses matching the session summary, and 8 defining a time out value and deleting session summaries associated with time buckets older than the time out value.

DETAILED DESCRIPTION OF THE PREFERRED EMBODIMENTS

For the purposes of promoting an understanding of the principles of the invention, reference a project was completed which demonstrated a preferred embodiment of the present invention. The project is described below, where the following terms are defined as follows:

"Flow" and "IP flow" means any IP packet stream between the same set of IP addresses and ports with the same IP protocol type. "CF" means Continuing Fragments. The CF flag is set to indicate that it is not the first record in the flow. "MF" means more fragments. In the first record of a long flow, the MF flag is set to indicate that there are more records related to this record. The MF flag is also set unless the session is timing out due to the Session Inactivity Timeout (SIT) value.

The project which demonstrated the present invention can generally be described as sensor software. The specific program was written as a narrow focus, single purpose tool used to monitor IP packet flows, and was named "Flo" by the inventors. This embodiment of the present invention was written to read either tcpdump format files or to attach itself to an Ethernet interface. Design and testing was performed on common PCs running the Linux operating system. Those having ordinary skill in the art will readily recognize that the steps of the present invention could readily be applied in different operating environments. Thus, while the detailed description below utilizes commands common to UNIX/LINUX, equivalent commands exist in different operating systems, including but not limited to Microsoft Windows and Apple OSX, and the present invention should be understood to encompass the method as described herein written for these operating systems using these equivalent commands.

The software was written to load IP address tables which are then used to annotate the output records. A country code file, such as from GeoIP, allows each IP in a flow to be identified. Similarly, a file of address spaces in use by each site can be used to further tag the output records. Finally, a file of address spaces known to be external to all monitored sites was used to generate a list of address spaces belonging to the monitored sites.

The Flo software was constructed to handle standard Ethernet and 802.1Q (VLAN) traffic. In this demonstration, no other layer 2 protocols were supported. Those having ordinary skill in the art will readily recognize that such protocols can be supported with appropriate modifications. The payload portions of the packet are not examined in any way by Flo, however, those having ordinary skill in the art will readily recognize that the software can be readily be modified to examine those payload portions in any manner desired by a user.

A channel to the syslog daemon using LOCAL0 is created early in program startup. If the '--foreground' switch is not given on the command line, the process is detached from the terminal. Signals create a heartbeat that allows the software to monitor the passage of time, create reports, and perform other functions on a periodic basis. These signals also monitor program shutdown.

The normal mode of operation is to run the software in daemon mode. In this mode, the software connects to an Ethernet interface to monitor packet flows in real time. The other mode is to specify an input file using the "--read" option switch. The special name "-" specifies standard input.

Packets may be decoded according to any of the various RFC specifications, such as 802.1Q (VLAN), ATM, or FDDI, for example, as determined by the needs of a particular user. While it is anticipated that IP, TCP, and UDP will be the protocols that will be preferred by most users, it should be understood that the present invention is equally capable of decoding packets and forming session summaries using any protocol that might be defined by a particular user. The actual length of the packet is compared with the length specified in the IP layer header to prevent decoding of either an illegal input or a garbage packet. The same checks are performed for UDP and TCP headers. These lengths are recorded in an intermediate structure along with the source and destination IP addresses and IP protocol type. If the protocol is one of UDP or TCP, the port numbers and the size of the data portion of the packet are recorded. If the protocol is TCP, then the flags fields along with the sequence number, if available, are also recorded.

The master cache is indexed by a hash key generated from the source and destination addresses and ports. The addresses and ports are folded together so that the packet direction does not affect the resulting key. This hash key is also used in the ring buffer indexing.

The key is used to index into the master cache using a hash table. Chaining resolves collisions. If the packet is part of an existing flow, the information from the decoded packet is merged into the previously saved information.

The passage of time represented by the timestamps in the incoming packets is managed by the ring buffer. Each flow is time stamped by the time of the last packet in the flow. This time is used to select the appropriate slot in the ring buffer. New packets for a flow carry a new timestamp and therefore change the ending timestamp for a flow. The position of a flow in ring buffer is modified based on the change in the timestamp.

Completed flows are reported by removing the last element of the ring buffer when it is about to be overwritten by new data. This embodiment of the program thus will not emit any flow records until the ring buffer has filled. Each node in the ring buffer represents flows that terminate within the same second. Other node sizes are possible but probably not necessary. The flows within each node are ordered by a hash of the source and destination addresses and ports. The records may not be in time order when appearing in the output file.

Partial flows are produced by early termination of the program. Partial flows are also produced by long duration flows which cause force out. These forced out flows will have timestamps that would appear to be in the future compared with other flow records adjacent to it in the output file. This situation is normal and is due to the forced out record being at the head of the queue and the normal complete flow records written from the end of the queue.

Two output modes were provided. The normal mode generates files in the specified output directory. The file names are derived from the termination time of the first flow written. The other mode allows the user to specify a name in which case, the file will be written in the specified directory or it can be "-" in which case it will be written to standard output.

The program will shutdown cleanly via two signals. The SIGHUP signal will flush any pending flows to the output file. These records will be marked as incomplete by use of a non-zero value in the force field. A value of zero or an empty field indicates a flow record that was written due to either the inactivity timeout or force out condition.

The TERM signal will terminate the program cleanly but will not write pending records to the output file.

The project which demonstrated the present invention is organized around a simple loop. A packet is read from either a file or a socket interface. The packet is decoded and information about the packet at the IP layer is saved in a flow buffer. Protocol specific information for UDP and TCP are also saved. The packet is assigned to an existing or new flow via the master flow cache. Information contained within the flow buffer indicates the location within the flow queue. The flow buffer is moved to the head of the flow queue if it is not already at the head.

Long duration flows are identified by producing intermediate results. At the time that a new packet for a flow is processed, the duration of the flow is compared with the "session force out" (sfo) command line parameter. If the duration exceeds this value, the session is written to the data store, and the packet data accumulators are cleared. In this way, a long running flow will consist of a series of records. The summation of the data from the individual records will reproduce the totals for the flow.

The flow queue is constructed of a sequence of individual caches identical in structure to the master cache. Each cache contains flows that currently terminate within a period of time determined by the "window" command line parameter. The length of the queue is determined by the "session inactivity timeout" (sit) command line parameter.

Flow duration and ending times are measured to the limit of the accuracy of the time stamps recorded by the system's network device driver. The resolutions of the time stamps are microseconds though the accuracy of the values may be much less. Observation of two different systems recording the same data stream and having their clocks in sync by the use of NTP shows that the time stamps may differ by at least 0.2 seconds.

The tail of the queue is examined for flows that should be flushed to disk. When no additional packets are seen for a session for a specified period of time, a record is created and recorded in the output file.

Flows for the purpose of this sensor are sequences of packets that have the same signature (source/destination address/port and protocol). Flows are not restricted to TCP but are applicable to all captured IP protocols.

There are two parameters that were used by the project which demonstrated the present invention to control the assembly of packets into flows. These are SIT (Session Inactivity Timeout) and SFO (Session Force Out). The value of SIT was nominally set to 4 minutes, however, as those having ordinary skill in the art will recognize, this value was chosen for the user's convenience, and other values could readily be utilized. Sessions, which have been idle for this length of time, are written to the capture file with the MF flag cleared indicating that there will be no subsequent records related to this flow.

Long running sessions will have more than one record relating to that session. Long running sessions are defined as a flow whose packet arrival times exceed the span of time specified by the value of SFO. Again, for the project which demonstrated the present invention this was set at 4 hours, but those having ordinary skill in the art will recognize, this value was chosen for the user's convenience, and other values could readily be utilized. The first such record in a long flow will have the MF flag set to indicate that there will be more records related to this record. Subsequent records will have the CF flag set to indicate that it is not the first record in the flow. The MF flag will also be set unless the session is timing out due to the SIT value as above.

The program logs startup, shutdown, configuration, file, and performance information to syslog using the local0 facility. If this facility is not configured, the default messages file will be used.

Several approaches to automatically obtaining a site address space have been suggested and analyzed. The first approach was to completely scan the IPv4 address space at the class C boundary (CIDR=24). This approach is not considered as the preferred approach. A modified approach to this that is more preferred would be to monitor the generated data and identify candidate address pairs where neither address had been identified as originating from the monitored site. Mapping probes sent to both addresses will be seen in the resulting data collection from only one of the addresses.

In reality, there are scans in progress across the internet at all times. In a preferred embodiment of the present invention, the only requirement for this mapping function is that the scan must originate externally from the monitored address space. Search engines, such as Google, and other internet mapping algorithms, can provide the requisite independent scanning.

A list of addresses, which are known to be external to the monitored site, were provided to the software. As sessions are identified and prepared for recording, the source and destination addresses are compared with the scanner list. Matching sessions have the other address in the session added to the list of address spaces associated with the monitored site. Addresses were initially trimmed to a CIDR value of 24. Adjacent address blocks were coalesced into larger blocks. Data is reported via syslog as a separate record for each address space.

Command line options may also be used to specify maps that provide an address to string id mapping. Two forms may be used as specified below. The first uses a CIDR block notation followed by the site tag. The tag value corresponds to the site tag used in the file name and in the site field (field 3) of the session/alert record, for example:

Tag aaa.bbb.ccc.ddd/cidr
Ipaddr1,ipaddr2,tag

The output from the software project which demonstrated the present invention can be quite voluminous. During conditions of a rapid scan, the number of records can more than double, which can overwhelm the processing, handling, and database loading functions. In a preferred embodiment, a limiting function is provided to prevent such an occurrence that can also be perceived as a DOS attack on the monitor software itself.

While the invention has been described in connection with specific embodiments utilized for the project undertaken to demonstrate a preferred embodiment of the present invention, those having ordinary skill in the art will readily that many changes and modifications may be made without departing from the invention in its broader aspects. The appended claims are therefore intended to cover all such changes and modifications as fall within the true spirit and scope of the invention.

The invention claimed is:

1. A method for converting packet streams into session summaries comprising the steps of:
   a. capturing packets from a transport layer,
   b. decoding the packets to determine the destination IP address and the source IP address,
   c. identifying packets having common destination IP addresses and source IP addresses,
   d. writing the decoded packets to an allocated memory structure as session summaries in a queue wherein said session summaries contain only packets having common destination and source IP addresses,
   e. creating a series of time buckets, each of the time buckets having a predefined beginning time and a predefined end time, wherein the time buckets are sequential in time,
   f. associating new session summaries with the time bucket covering the time period corresponding to the time the packet was captured from the transport layer, and
   g. moving a session summary to the time bucket at the front of the queue in response to an incoming packet having a destination IP addresses and source IP addresses matching the session summary.

2. The method of claim 1 wherein the step of decoding the packets further comprises determining TCP port source and destination numbers, flag fields, option fields, sequence number, length parameter, and combinations thereof.

3. The method of claim 1 wherein the step of decoding the packets further comprises determining UDP port source and destination numbers and the length parameter.

4. The method of claim 1, further comprising the step of defining a time out value and deleting session summaries associated with time buckets older than the time out value.

5. The method of claim 1 wherein one or more of the steps of
   a. capturing packets from a transport layer,
   b. decoding the packets to determine the destination IP address and the source IP address,
   c. identifying packets having common destination IP addresses and source IP addresses, and
   d. writing the decoded packets to an allocated memory structure as session summaries in a queue wherein said session summaries contain only packets having common destination and source IP addresses, are performed on separate threads.

6. A system for converting packet streams into session summaries comprising:
   a. An input device configured to capture packets from a transport layer, and
   b. a processor configured to:
      i. decode the packets to determine the destination IP address and the source IP address,
      ii. identify packets having common destination IP addresses and source IP addresses,
      iii. write the decoded packets to an allocated memory structure as session summaries in a queue wherein said session summaries contain only packets having common destination and source IP addresses, iv. wherein the processor is further configured to decode the packets to:
   a. create a series of time buckets, each of the time buckets having a predefined beginning time and a predefined end time, wherein the time buckets are sequential in time, and
   b. associate new session summaries with the time bucket covering the time period corresponding to the time the packet was captured from the transport layer, and
v. wherein the processor is further configured to move a session summary to the time bucket at the front of the Queue in response to an incoming packet having a destination IP address and source IP address matching the session summary.

7. The system of claim 6 further comprising decoding the packets to determine at least one of the TCP port source and destination numbers, flag fields, option fields, sequence number, length parameter, and combinations thereof.

8. The system of claim 6 further comprising decoding the packets to determine at least one of the UDP port source and destination numbers and the length parameter.

9. The system of claim 6, wherein the processor is further configured to define a time out value and delete session summaries associated with time buckets older than the time out value from the allocated memory structure.

10. The system of claim 6 wherein the processor is configured to:
   i. decode the packets to determine the destination IP address and the source IP address,
   ii. identify packets having common destination IP addresses and source IP addresses, and
   iii. write the decoded packets to an allocated memory structure as session summaries in a queue wherein said session summaries contain only packets having common destination and source IP addresses,
on at least two separate threads.

11. A computer readable medium having computer-executable instructions for performing a method for converting packet streams into session summaries comprising the steps of:
   a. capturing packets from a transport layer,
   b. decoding the packets to determine the destination IP address and the source IP address,
   c. identifying packets having common destination IP addresses and source IP addresses.
   d. writing the decoded packets to an allocated memory structure as session summaries in a queue wherein said session summaries contain only packets having common destination and source IP addresses
   e. creating a series of time buckets, each of the time buckets having a predefined beginning time and a predefined end time, wherein the time buckets are sequential in time,
   f. associating new session summaries with the time bucket covering the time period corresponding to the time the packet was captured from the transport layer, and
   g. moving a session summary to the time bucket at the front of the queue in response to an incoming packet having a destination IP addresses and source IP addresses matching the session summary.

12. The computer readable medium having computer-executable instructions for performing a method for converting packet streams into session summaries of claim 11 wherein the step of decoding the packets further comprises determining TCP port source and destination numbers, flag fields, option fields, sequence number, length parameter, and combinations thereof.

13. The computer readable medium having computer-executable instructions for performing a method for converting packet streams into session summaries of claim 11 wherein the step of decoding the packets further comprises determining UDP port source and destination numbers and the length parameter.

14. The computer readable medium having computer-executable instructions for performing a method for converting packet streams into session summaries of claim 11, further comprising the step of defining a time out value and deleting session summaries associated with time buckets older than the time out value.

15. The computer readable medium having computer-executable instructions for performing a method for converting packet streams into session summaries of claim 11 wherein the steps of:
   a. capturing packets from a transport layer,
   b. decoding the packets to determine the destination IP address and the source IP address,
   c. identifying packets having common destination IP addresses and source IP addresses, and
   d. writing the decoded packets to an allocated memory structure as session summaries in a queue wherein said session summaries contain only packets having common destination and source IP addresses, are performed on at least two separate threads.

* * * * *